United States Patent [19]

Brownrigg et al.

[11] Patent Number: 5,118,932
[45] Date of Patent: Jun. 2, 1992

[54] SHAFT ROTATION RATE SENSOR WITH A DIFFRACTION GRATING PRODUCING A VELOCITY-RELATED BEAT FREQUENCY

[75] Inventors: Patrick C. Brownrigg, Long Beach; Victor Vali, Laguna Hills; David B. Chang, Tustin, all of Calif.

[73] Assignee: Hughes Aircraft Company, Los Angeles, Calif.

[21] Appl. No.: 611,598

[22] Filed: Nov. 13, 1990

[51] Int. Cl.$^5$ ................................. H01J 5/16
[52] U.S. Cl. .................... 250/237 G; 356/356
[58] Field of Search ......... 250/231.13, 237 G, 231.17, 250/231.18; 356/356, 349, 37 H

[56] References Cited

U.S. PATENT DOCUMENTS

| | | | |
|---|---|---|---|
| 4,299,490 | 11/1981 | Cahill et al. | 356/350 |
| 4,710,026 | 12/1987 | Magome et al. | 356/356 |
| 4,892,426 | 1/1990 | Steele | 400/708 |
| 4,901,255 | 2/1990 | Lynn et al. | 364/551 |
| 4,915,503 | 4/1990 | Paviath | 356/350 |
| 4,916,718 | 4/1990 | Manring | 378/4 |
| 4,987,299 | 1/1991 | Kobayashi et al. | 250/237 G |

OTHER PUBLICATIONS

"Interferometry," W. H. Steel, Second Edition, Cambridge University Press, 1983, pp. 57–58.
"Optical Frequency Shifting by Means of a Rotating Diffraction Grating," W. H. Stevenson, APPLIED OPTICS, vol. 9, No. 3, Mar. 1970, pp. 949–652.

*Primary Examiner*—David C. Nelms
*Assistant Examiner*—Que T. Le
*Attorney, Agent, or Firm*—Michael W. Sales; Wanda K. Denson-Low

[57] ABSTRACT

A shaft rotation rate sensor for turbine engines. A reflective radial grating on the surface of the turbine shaft is employed in conjunction with an electromagnetic wave source and beam combining elements to mix two beams of frequency f and f±Δf, where Δf is proportional to the rotation rate of the grating. The source energy is reflected off the grating, and the zero-th and first order transmission from the grating are mixed to give the beat frequency proportional to the rotation rate. The sensor has no moving parts.

12 Claims, 4 Drawing Sheets

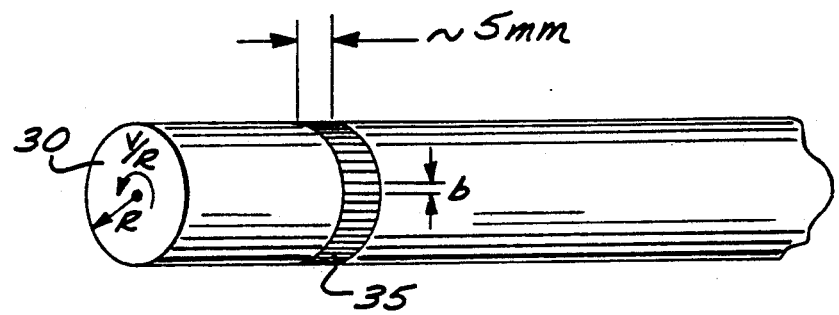
FIG. 4A
FIG. 4B
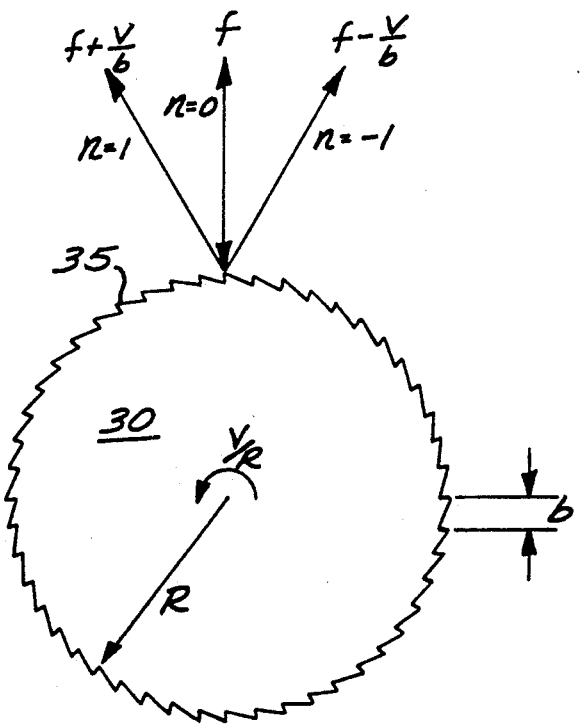

SHAFT ROTATION RATE SENSOR WITH A DIFFRACTION GRATING PRODUCING A VELOCITY-RELATED BEAT FREQUENCY

BACKGROUND OF THE INVENTION

The present invention relates to sensor apparatus for measuring the rotation rate of a rotating shaft, such as a turbine engine shaft.

One type of conventional turbine shaft tachometer employs a magnetic pick-up on the turbine blade to electrically induce a voltage which is proportional to rotation speed. Another type of turbine shaft tachometer uses a gear ratio pick-up off the drive train to mechanically gear down the shaft rotation speed. These methods work but suffer from extreme temperatures, electromagnetic interference and large angular noise spectral density due to engine action and gear backlash. These three factors can induce high sensor failure rate and require expensive schemes in packaging to insure survivability. Moreover, these methods are neither very accurate, very fast, or immune to electromagnetic interference.

SUMMARY OF THE INVENTION

It is therefore an object of this invention to provide an apparatus for sensing the rotation rate of a rotating shaft such as a turbine shaft which is accurate, reliable and relatively inexpensive, and which can provide the instantaneous rotation rate of the turbine shaft.

A sensor system for measuring the rotation rate of a rotating shaft in accordance with the invention comprises an optical grating carried with the shaft and characterized by grating slits disposed transversely to the direction of motion of the surface on which the slits are placed. A source of electromagnetic energy is arranged to direct a beam of energy toward the grating. In a preferred embodiment, the source is a laser operating in the infrared range. The sensor includes means for combining different orders of the energy diffracted by the grating to develop an energy beat frequency which is dependent on the velocity of the grating. A detector is responsive to the combined energy and provides a detector output signal indicative of the beat frequency. A processor converts the detector output signal into the shaft rotation rate.

In one embodiment the grating comprises a radial grating disposed on an end of the shaft. In another embodiment the grating comprises a grating formed around the circumferential side of the shaft.

BRIEF DESCRIPTION OF THE DRAWING

These and other features and advantages of the present invention will become more apparent from the following detailed description of an exemplary embodiment thereof, as illustrated in the accompanying drawings, in which:

FIGS. 4A and 4b illustrate the frequency shift and beam directions for a rotating shaft with a circumferential grating.

DETAILED DESCRIPTION OF THE PREFERRED EMBODIMENT

It has been shown that optical frequency shifts can be produced in various diffraction orders of a linear grating moving in a direction perpendicular to the rulings. See, e.g., "Interferometry," W.H. Steel, Second Edition, Cambridge University Press, 1983, pages 57–58; "Optical Frequency Shifting by Means of a Rotating Diffraction Grating," W.H. Stevenson, APPLIED OPTICS, Vol. 9, No. 3, Mar. 1970, pages 649–652.

Figure 1:
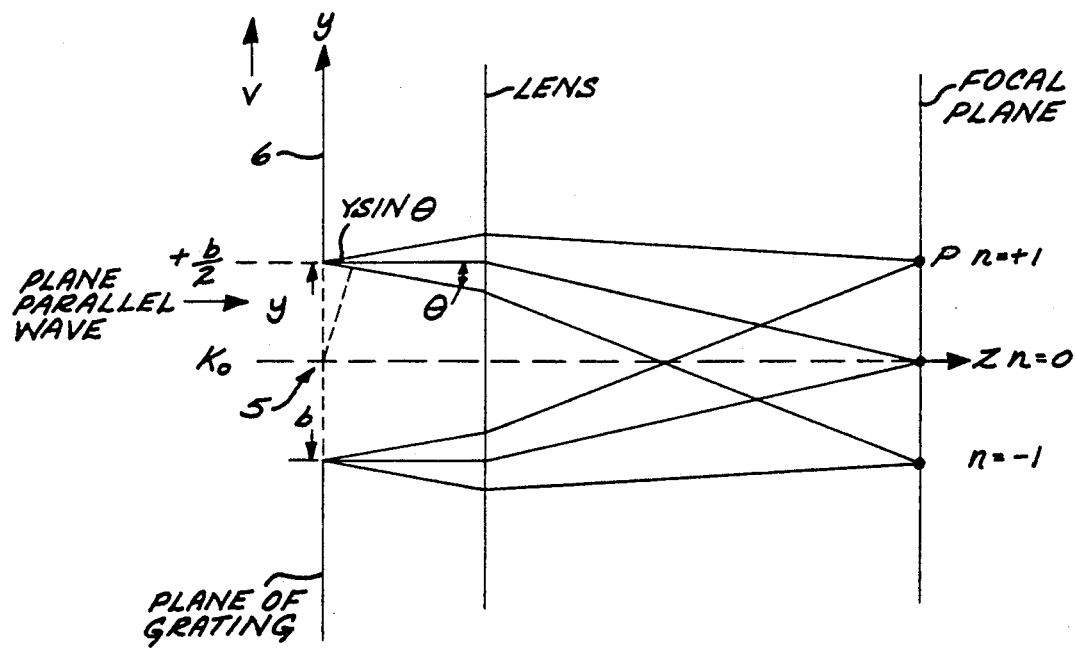
FIG. 1 illustrates the principle of optical frequency shifts for a grating slit illuminated by a source.

Consider the case of Fraunhoffer-type diffraction by a single slit of width b and length L. (It is easy to start with describing the field for one slit. To generalize for a grating (multiple slits equally spaced), the field is summed over N, the total number of slits illuminated by the source.) FIG. 1 illustrates the geometry. A plane parallel wave of frequency $w_o$ is incident on a slit 5 formed in a grating 6, where the slit edges diffract the incident beam through the angle $\Theta$. A lens 7 converges the diffracted beams at a lens focal plane 8. The distribution of the field at point P is given by the Fresnel-Kirchoff formula, $$U_p = C \int \int e^{ik_o r} dx dy e^{iw_o t} \quad (1)$$

where C is a constant, $dxdy = Ldy$, $w_o = 2\pi f$, $\Theta = n(\lambda/b)$, $k_o = 2\pi/\lambda_o$, and $n = 0, \pm 1, \pm 2$, and r is the distance from the plane of the grating to the focal plane. For the slit moving with velocity v, r can be expressed as, $$r = r_o + (y + vt) \sin\Theta, \quad (2)$$

where $r_o$ is the value of r for $y=0$ and $\Theta = \lambda/b$.

Substituting r into the relationship for $U_p$ gives $$U_p = LCe^{ik_o r_o} e^{i(wt + kvt \sin\Theta)} \int e^{ik_o y \sin\Theta} dy. \quad (3)$$

The frequency shift is $\Delta f = (\frac{1}{2}\pi) kv \sin\Theta$.
When $(n\lambda/b) << 1$, $$\sin\Theta \approx \Theta = (n\lambda/b) \text{ and} \quad (4)$$

$$\Delta f = (nv/b) \quad (5)$$

Therefore, by combining two beams of different diffraction orders n, say $n=0$ and $n=+1$, they interfere to produce a beat frequency $\Delta f$. The beat frequency can then be converted into a rotation rate in accordance with $f_r = \Delta fb/n2\pi r$, where r is the radial point at which the beam strikes the grating, and fr is the rotation rate in revolutions per second.

Figure 2:
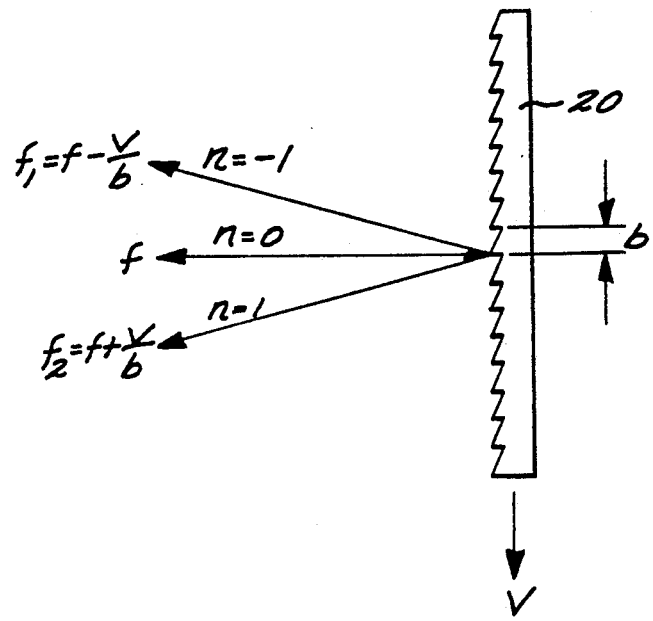
FIG. 2 illustrates the frequency shift and beam directions for a moving linear grating.
Figure 3:
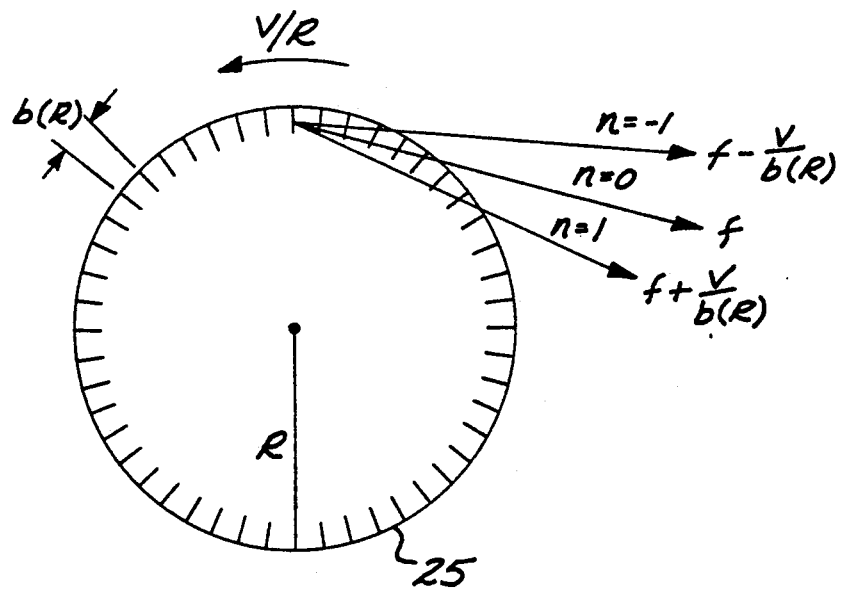
FIG. 3 illustrates the frequency shift and beam directions for a moving radial grating.

For a reflective grating the principle is the same in a linear or radial configuration. FIGS. 2, 3 and 4 illustrate the geometry.

FIG. 2 illustrates the frequency shift and beam directions for a linear moving grating 20 having a grating spacing b. The zero-th order reflected beam, i.e., the non-diffracted beam, has a frequency f equal to the source frequency. The diffracted beam of order $n=1$ has a frequency $f_1 = f - v/b$, where v is the velocity of the moving grating. The diffracted beam of order $n=1$ has a frequency $f_2 = f + v/b$.

FIG. 3 illustrates the frequency shift and beam direction for a moving radial grating 25 of radius R and with a grating spacing b(R) which is a function of the i radius R. The shaft is rotating at a rotation rate of v/r, where v is the velocity of a point on the shaft surface. The zero-th order reflected beam has a frequency f, the source frequency. The diffracted beam of order $n-1$ has a frequency $f_1 = f - v/b(R)$. The diffracted beam of order $n+1$ has a frequency $f_2 = f + v/b(R)$.

FIGS. 4A and 4B illustrate the frequency shift and beam direction for a rotating shaft 30 with a circumferential grating 35 formed thereon. The shaft has a radius R, and rotates at a rate v/R, where v is the velocity of a point on the circumference of the shaft 30. The grating 35 has a grating spacing b. Light from a source of frequency f is diametrically incident on the grating 35. The zero-th order reflected light has a frequency f. The diffracted beam of order $n-1$ has a frequency $f_1 = f - v/b$. The diffracted beam of order $n+1$ has a frequency $f_2 = f + v/b$.

Figure 5:
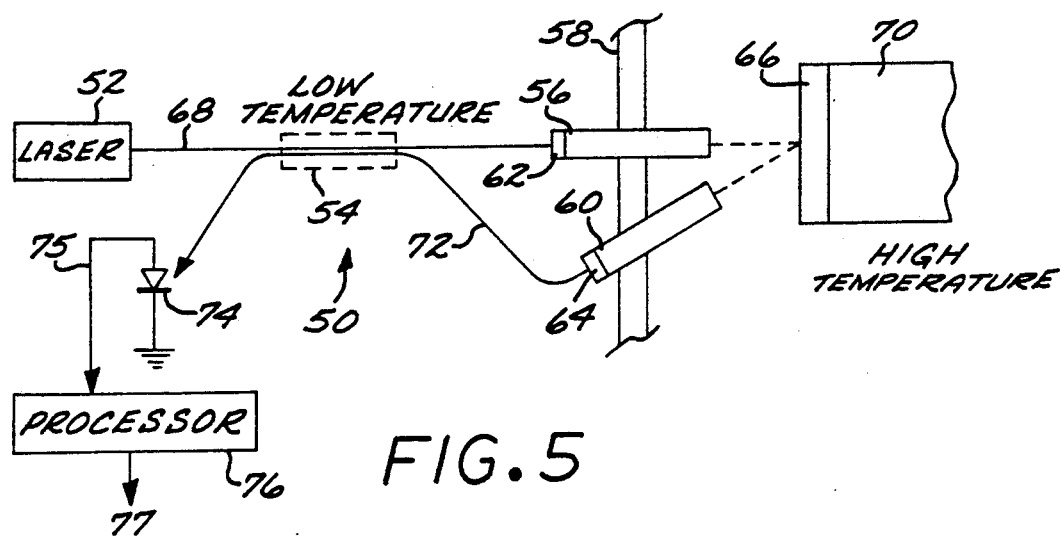
FIGS. 5 and 6 are simplified block diagrams of a turbine shift rotation rate sensor employing radial and circumferential gratings respectively, in accordance with the invention.
Figure 6:
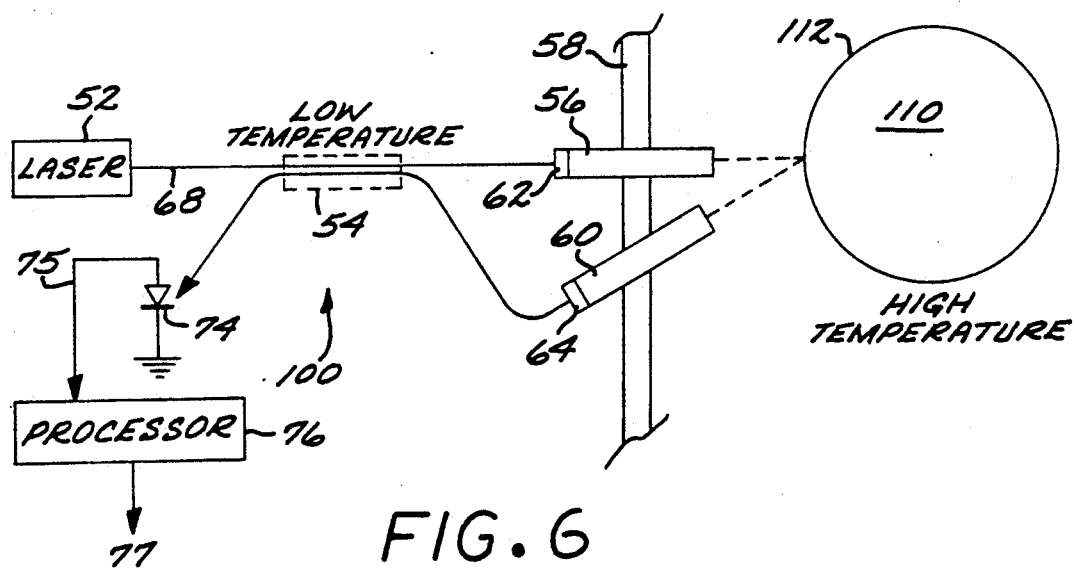

Because of the aforementioned environmental factor, i.e., temperature, the method for delivering the light onto the grating must be immune to temperature. A preferred embodiment of the invention is shown in FIG. 5 for a radial grating. A second embodiment of the invention is shown in FIG. 6. The sapphire fibers and grating are suggested because in practical applications they can withstand temperature of more than 2000° C. and are chemically inert.

FIG. 5 illustrates a turbine (or other rotating shaft machinery) shaft rotation rate sensor system 50 employing a radial grating 66 as described with respect to FIG. 3. Here, the turbine shaft 70 rotates at some rate to be measured by the system 50 using a reflective radial optical grating 66 blazed on an end of the shaft 70. A bulkhead 58 separates the high temperature environment of the shaft from the relatively low temperature environment in which other elements of the system 50 are disposed.

The light source for the system 50 is a laser 52. A laser suitable for this application is the PT-450-670-TOLD 9211 semiconductor diode laser available from Seastar, 316 Second Avenue, Seattle, Wash., generating laser light at the wavelength of 670 nm (red). For this wavelength, the grating spacing would be at least two microns. The optical beam path is provided by a single mode optical fiber 68 connecting from the laser 52 to the fiber optic beamsplitter 54 and then to the gradient index lens 62. An exemplary beamsplitter suitable for the purpose is the part number 906, marketed by Canadian Instrumentation, Mississauga, Ontario, Canada. The lens 62 is optically coupled to the sapphire optical fiber 56 which extends through the bulkhead 58.

The system 50 also includes a second sapphire fiber 60. One end of the fiber 60 is optically coupled to a second gradient index lens 64, in turn coupled to the single mode optical fiber 72. The fiber 72 connects through the beamsplitter 54 and to the optical detector 74. A processor 76 is responsive to the detector output signal at 75 to generate an output signal at 77 indicative of the shaft rotation rate.

The purpose of the gradient index lenses 62 and 64 is to collimate the source light into the respective sapphire fibers 56 and 60. An exemplary lens suitable for this purpose is the part number FCH-IF-SMF-0.63, marketed by NSG of America, Somerset, N.J. This type of lens can be fuse coupled directly to the end of the fiber 56 or 60.

FIG. 6 illustrates an alternative embodiment of a turbine shaft rotation rate sensor system 100 using the circumferential grating configuration of FIG. 4. The system 100 is similar to the system 50 of FIG. 5 except that light is reflected from the side of the shaft 110 by the grating 112, which is of the configuration of grating 35 of FIG. 4A. The grating can be fabricated on the shaft by techniques well known to those skilled in the art.

The system 50 of FIG. 5 work as follows. The laser light source 52 generates light at frequency f, which is coupled to the single mode optical fiber 68. The beamsplitter 54 splits the light from the laser 50% to both arms of the beam path, i.e., 50% to the path of fiber 68 to lens 62 and 50% to fiber 72 to lens 64. The respective gradient index lens 62 and 64 collimates the respective beams into the sapphire fibers 56 and 60, which then illuminate the grating 66. The zero-th order beams are reflected back along the same respective paths. The $n^{th}$ order diffracted beam enters the other sapphire fiber at $f + \Delta f$ where $\Delta f = v/b$. Fibers 56 and 60 are placed at an angle $\alpha$ with respect to each other. The value of this angle is $\alpha = \sin^{-1} \lambda/b$, where $\lambda$ is the wavelength of operation. The two beams then combine at the beamsplitter 54, with half the combined light going back to the laser and the other half to the detector 74, comprising a photodiode. The photodiode should have a bandwidth greater than $\Delta f$. This is easily attainable. For example, a grating moving with speed 1000 cm/sec (corresponding to rotation speed of 160 rps for a 1 cm radius turbine shaft) and having grating spacing $b = 1$ $\mu$m the frequency shift will be $$\Delta f = v/a = 10/10^{-6} = 10 \text{ MHz}.$$

An exemplary photodetector suitable for the purpose is the silicon PIN diode, model C300971EQC, marketed by RCA Inc. Electro-optics, P.O. Box 900, Vaudreuil, Quebec, Canada.

The detector 74 envelope detects the combined light beams which interfere to produce the beat frequency $\Delta f$, and responds to the beat frequency $\Delta f$ to produce a voltage output signal. The processor 76 converts the beat frequency $\Delta f$ to a signal indicative of the rotation rate of the shaft 70. The processor 76 comprises a frequency counter for determining $\Delta f$ in response to the detector 74 signal. A device suitable for the purpose of the frequency counter is the voltage-to-frequency converter, part number LM2907, available from National Semiconductor Corporation, 1900 Semiconductor Drive, Santa Clara, Calif. The processor 76 further includes means for converting the beat frequency into the shaft rotation rate using eq. 5, $\Delta f = nv/b$, and the rotation rate $w = v/R$. Such conversion means could be implemented as a ROM look-up table, or calculated in real time by a microprocessor programmed to perform the necessary calculations. The processing can readily be done without the need for very high speed circuitry. Variations in rotation speed can be detected with a millisecond delay time.

The system 100 operates in a manner similar to that of system 50 of FIG. 5.

To avoid signal loss due to dirt the grating spacing can be increased to a wavelength corresponding to infrared and beyond if need be, i.e., millimeter wave.

This invention has the added benefit of in-situ monitoring of bearing failure by analyzing the line width of $\Delta f$. As an example, ball bearings will modulate $\Delta f$ at the roller balls frequency. If the balls begin to degrade, the modulation (and higher harmonics) will increase in amplitude. By monitoring this modulation and $\Delta f$, one can obtain an indication of bearing wear. Furthermore, synchronization of multiple engines (or rotating shafts) can be performed with electromagnetic interference immunity. The system output from the processors of FIGS. 5 and 6 can provide an indication of shaft acceleration or deceleration ($\pm d\Delta f/dt$) to the engine controller. As part of an adaptive feedback control to provide a lean or rich fuel mixture based on the sign and amplitude of $d\Delta f/dt$, one can compensate for engine misfire.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A rotation rate sensor system for measuring the rotation rate of a rotating shaft, comprising;
   an optical grating carried with the shaft and characterized by grating slits disposed transversely to the direction of motion of the shaft;
   a source of electromagnetic energy arranged to direct a beam of energy toward said grating;
   means for combining the energy diffracted by the grating to develop an energy beat frequency which is dependent on the velocity of the grating; and
   means responsive to the energy beat frequency to provide a sensor signal indicative of the rotation rate of the shaft.

2. The sensor system of claim 1 wherein said grating comprises a radial grating disposes on an end of said shaft.

3. The sensor system of claim 1 wherein said grating comprises a grating formed around the circumferential side of the shaft.

4. The sensor system of claim 1 wherein said source of electromagnetic energy comprises a laser for generating a beam of light.

5. The sensor system of claim 3 further comprising:
   optical beamsplitter/combiner means for splitting light from said laser into two optical paths and for combining light received from said optical paths and providing at least part of the combined light energy to a detector optical path;
   first optical fiber means for conducting light between said laser and said beamsplitter;
   first optical path defining means for conducting light between said beamsplitter and said grating, said means arranged so that light is incident on said grating from said laser source at a first angular orientation thereto, and zero-th order light reflected from said grating is conducted back to said beam-splitter/combiner;
   second optical path defining means for conducting light between said beamsplitter and said grating, said means arranged so that light is incident on said grating from said laser source at a second angular orientation thereto, and zero-th order light reflected from said grating and nth order light refracted from said grating from said first optical path defining means is conducted back to said beamsplitter/combiner; and
   said first optical path defining means further arranged so that $n^{th}$ order light diffracted from said grating from said first optical path defining means is conducted back to said beamsplitter/combiner;
   wherein said beamsplitter/combiner comprises said means for combining the energy diffracted by the grating to develop an energy beat frequency.

6. The sensor system of claim 5 wherein said shaft is a turbine shaft operating in a high temperature environment, and further characterized in that said first optical path defining means comprises a first sapphire optical fiber, and said second optical path defining means comprises a second sapphire optical fiber.

7. The sensor system of claim 5 wherein said respective first ends of said first and second sapphire optical fibers extend through a bulkhead into said high temperature turbine operating environment, and the second ends of said sapphire fibers are coupled to first and second lens elements which collimate the light incident from the laser via the beamsplitter/combiner.

8. The sensor system of claim 1 wherein said combining means comprises means for combining the zero order and first order diffracted energy beams from said grating, and wherein said beat frequency is the difference between the frequency of the zero order beam and the frequency of the first order diffracted beam.

9. The sensor of claim 1 wherein said grating is characterized by a grating line spacing b selected in dependence on the operating wavelength $\lambda$ of the electromagnetic energy such that $\lambda/b$ is much less than one.

10. The sensor system of claim 1 wherein said grating is characterized by a grating having a number of slits of width b, and wherein the beat frequency is substantially equal to v/b, where v represents the angular velocity of a point on the periphery of the shaft.

11. The sensor system of claim 1 wherein said means responsive to the energy beat frequency comprises a photoelectric detector responsive to the beat frequency to develop a detector voltage indicative of the beat frequency.

12. The sensor system of claim 1 wherein said means responsive to the energy beat frequency further comprises a processor for converting said detector voltage into a corresponding shaft rotation rate.

* * * * *